N

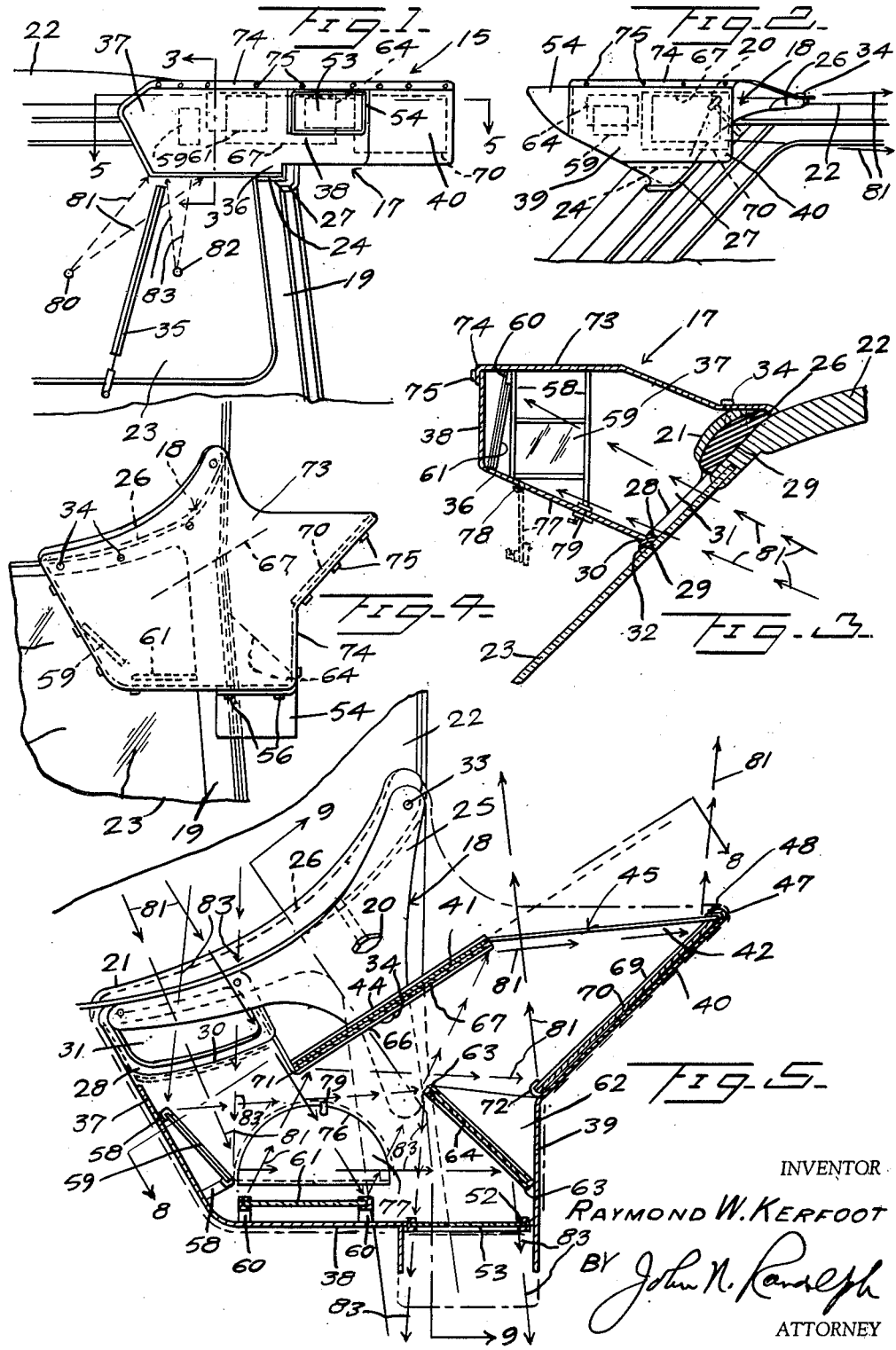

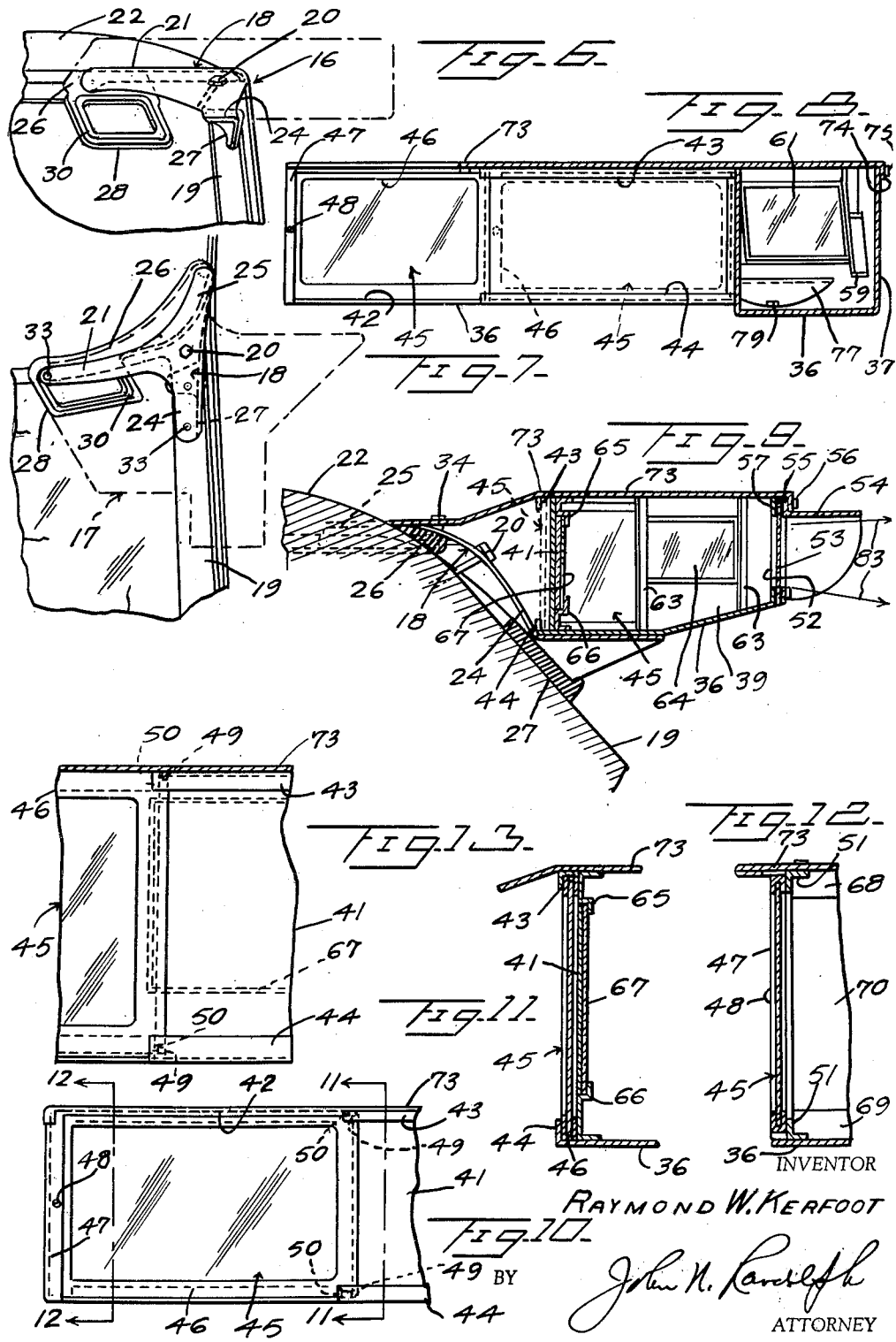

United States Patent Office 3,033,083
Patented May 8, 1962

3,033,083
FRONT AND REAR VIEW REFLECTOR UNIT FOR A VEHICLE
Raymond W. Kerfoot, Rte. 3, Box 3102, Wenatchee, Wash.
Filed July 29, 1960, Ser. No. 46,206
8 Claims. (Cl. 88—70)

This invention relates to an improved reflector or mirror unit for motor vehicles and has for its primary object to provide a reflector unit capable of replacing conventional interior and exterior rear view mirrors, as presently employed on motor vehicles, and by means of which the operator of a vehicle can view both the area in front of and behind the vehicle through a single viewing aperture of the unit.

Another object of the invention is to provide a fore and aft viewing reflector unit which is adapted to be mounted on the exterior of a motor vehicle adjacent to and above the upper left hand corner of the windshield, in a location where said unit will not provide an obstruction to the normal viewing area through the windshield, yet which is so located that the vehicle operator obtains his selected views to the front or rear, through the unit, by looking through a part of the windshield, so that very little movement of the eyes, away from the normal range of view, is required.

Another object of the invention is to provide a unit which is disposed at approximately the level of the top of a vehicle so that the fields of vision therethrough will not be obscured by dust eddies or mist created by this or other vehicles running over dusty surfaces or over wet or slush covered surfaces, respectively.

Still another object of the invention is to provide a viewing unit which is closed and sealed for protecting the reflectors thereof from dust or moisture and which will require a minimum of cleaning and servicing to maintain the unit in proper condition for use.

Various other objects and advantages of the invention will hereinafter become more fully apparent from the following description of the drawings, illustrating a presently preferred embodiment thereof, and wherein:

FIGURE 1 is a front elevational view showing the unit in an applied position;

FIGURE 2 is a side elevational view of the reflector unit looking from right to left of FIGURE 1;

FIGURE 3 is a vertical sectional view, on an enlarged scale, taken substantially along a plane as indicated by the line 3—3 of FIGURE 1;

FIGURE 4 is a top plan view of the unit;

FIGURE 5 is a horizontal sectional view, on an enlarged scale, taken substantially along a plane as indicated by the line 5—5 of FIGURE 1;

FIGURE 6 is a front elevational view of the mounting structure of said unit;

FIGURE 7 is a top plan view thereof;

FIGURE 8 is a sectional view partly in elevation, taken substantially along the line 8—8 of FIGURE 5;

FIGURE 9 is a vertical sectional view, taken substantially along the line 9—9 of FIGURE 5;

FIGURE 10 is a fragmentary rear elevational view of the unit;

FIGURE 11 is a cross sectional view, taken substantially along a plane as indicated by the line 11—11 of FIGURE 10;

FIGURE 12 is a similar view, taken substantially along a plane as indicated by the line 12—12 of FIGURE 10, and FIGURE 13 is an enlarged fragmentary elevational view of a part of the structure as seen in FIGURE 10.

Referring more specifically to the drawings, the front and rear view reflector unit in its entirety is designated generally 15 and includes a mounting structure, designated generally 16 and best illustrated in FIGURES 6 and 7, and by means of which a housing or casing, designated generally 17, is detachably supported on a motor vehicle.

The mounting structure 16 includes a spider 18, as best seen in FIGURE 7, which is secured to the left front corner post 19, preferably by a single screw fastening 20, and which has one arm 21 extending along the portion of the forward edge of the vehicle roof 22, above the upper left hand corner of the vehicle windshield 23, a second arm 24 which extends downwardly along the corner post 19, and a third arm 25 which extends rearwardly along a portion of the left hand edge of the roof 22. A cushioning pad 26 is disposed under the arms 21 and 25 and a cushioning pad 27 is disposed between the arm 24 and post 19. The pads 26 and 27 are formed of a yieldable material such as sponge or foam rubber and may vary in thickness depending upon the contour of the vehicle parts engaged thereby. The spider 18 is preferably formed of semi-spring steel and is shaped so that it can spring or yield to conformably engage the contours of the outer surfaces of the pads 26 and 27, which is governed by the contours of the vehicle surfaces 19 and 22, engaged by said pads. The pad 26 has a depending portion extending below the arm 21 and forming a substantially rectangular frame 28 which bears against a part of the windshield 23, near the upper edge of the windshield, and which frame is elongated horizontally or lengthwise of the windshield. The pads 26 and 27 are secured to the vehicle body surfaces and the frame portion 28 is secured to the windshield by a weather-proof adhesive 29, as seen in FIGURE 3.

The housing 17 has a marginal portion 30 which is disposed at an incline and which defines an opening 31 of said housing. The marginal portion 30 seats in an outwardly opening groove or channel 32 of the pad frame 28 so that said frame in effect forms a viewing opening to the interior of the housing 17, from the interior of the vehicle, through a part of the upper left hand corner of the windshield. As seen in FIGURE 7, the spider 18 has a plurality of tapped openings 33 for receiving screw fastenings 34 which extend through parts of the housing 17 for anchoring the housing immovably to the spider 18. Thus, the housing 17 is supported in substantially a horizontal plane, as seen in FIGURES 1 and 2, and so as to extend forwardly and laterally outward from the upper left hand corner of the windshield and the left front corner post 19. The housing 17 and mounting structure 16 are thus located so that they will afford a minimum obstruction to vision through the windshield 23, and said parts are disposed above the area of the windshield which is wiped by the wiper 35, located in front of the vehicle operator, as illustrated in FIGURE 1.

As best seen in FIGURES 3, 5 and 7, the housing 17 includes a bottom wall 36 portions of which slope downwardly and inwardly with respect to the windshield, an inner side wall 37, which extends outwardly at an incline away from the longitudinal center of the vehicle, a front wall 38, an outer side wall composed of portions 39 and 40, forming an oblique angle, a rear wall portion 41, which is disposed approximately at a right angle to the inner side wall 37, and a rear opening 42. The opening 42 is disposed between the rear ends of the walls 40 and 41, which walls are disposed substantially parallel to one another, as seen in FIGURE 5.

The rear wall 41 on its outer side is provided with top and bottom guide channels 43 and 44, respectively, which open toward one another to slidably receive a rear window 45, the top and bottom edges of the frame 46 of which slidably engage in said channels. The window 45 in its normal closed position, as illustrated in FIGURES 10, 12 and 13, closes and seals the rear opening 42. The side wall 40 has an inturned lip 47 at its rear end which engages around an end of the frame 46, and a screw fastening 48 extends through said lip and into said frame end for securing the window 45 in its closed position. The other end of the frame 46 has pins 49 at the top and bottom thereof which fit slidably in the channels 43 and 44 and which are adapted to abut inturned stops or crimped rear ends 50 of said channels to prevent said last mentioned end of the frame 46 from being disconnected from the channels 43 and 44 and to cooperate with the lip 47 and fastening 48 to hold the window frame 46 snug against the outer sides of sealing gaskets 51, as seen in FIGURE 12, in the closed position of said window, for sealing the opening 42.

The front wall 38, adjacent the wall 39, is provided with a flanged opening 52 in which a windowpane 53 is mounted. A visor 54 extends outwardly from the front wall 38 above and at the sides of the window 53 and has an outturned flange 55 at its inner end which is secured by fastenings 56 to the wall 38 and which bears against and holds the windowpane 53 in position. A gasket 57, providing a weather seal, may be provided around the opening 52, between the wall 38 and the marginal portion of the pane 53.

A pair of guide channels 58 are secured to the wall 37 and disposed on the inner side thereof. The channels 58 extend upwardly at an incline inwardly from a lower portion of the wall 37 and open toward one another to receive therein a reflector 59, the reflective surface of which faces inwardly of the housing 17. A second pair of channel members 60 are secured to the inner side of the lower portion of the front wall 38, between the wall 37 and window 53 and likewise extend upwardly at an incline away from the wall 38 and open toward one another to mount a second reflector 61, the reflective surface of which also faces inwardly of the housing.

Vertical brace plate 62 is secured to and extends inwardly from the rear portion of the wall 39, said plate being substantially rectangular shaped, as indicated in FIGURES 5 and 9, and having an upwardly extending channel member 63 on its inner side to match the channel member 63 on wall 39 in order to receive a reflector 64 which is disposed in substantially an upright position, behind the window 53 and approximately at an acute angle thereto, and the reflective surface of which faces toward said window and the front wall 38.

As seen in FIGURES 9 and 11, the rear wall 41 has internally disposed top and bottom guide channels 65 and 66, respectively, for receiving a reflector 67 which faces generally in a forward direction toward the front wall portion 40. Said front wall portion 40, on its inner side, has a top guide channel 68 and a bottom guide channel 69, as seen in FIGURE 12, for receiving a reflector 70 which faces toward the opening 42. The reflectors 67 and 70 are inserted into the housing 17 through the opening 42. A stop 71 is provided at the inner ends of the guide channels 65 and 66 and a stop 72 is provided at the inner ends of the guide channels 68 and 69, for limiting the extent that the reflectors 67 and 70, respectively, can be inserted into the housing 17, as seen in FIGURE 5.

The housing 17 also includes a top wall 73 which is secured by certain of the fastenings 34 and which has downturned flanges 74 engaging the outer sides of the upper portions of the walls 37, 38, 39 and 40, and which are detachably secured to said walls by fastenings 75. The reflectors 59, 61, 64, 67 and 70 may be applied before application of the top wall 73. In applying the reflectors 59, 61 and 64, the guide channels thereof may be crimped for holding the reflectors in different vertically adjusted positions; however, said guide channels 58, 60 and 63 will normally have a sufficient tight engagement with the reflectors 59, 61 and 64, respectively, to retain said reflectors in desired adjusted positions.

As seen in FIGURES 3 and 5, the bottom wall 36 has an access opening 76 which is located between the reflectors 59, 61 and 64 to enable said reflectors and the inner side of the window 53 to be readily cleaned, when necessary, without removing the top wall 73. The opening 76 is normally closed and sealed by a door 77 which is hinged, as seen at 78, to swing downwardly to an open position, as seen in dotted lines in FIGURE 3, and which is provided with a conventional latch 79 for retaining said door in its closed position.

Assuming that the reflector unit 15 is mounted as illustrated in the drawings, a vehicle operator in order to obtain a view to the rear of the vehicle looks through the opening 31 from the position 80, as seen in FIGURE 1, toward the reflector 61 to view the image reflected from the reflector 67 and which is in turn reflected from the reflector 70 through the rear window 45, as indicated by the broken arrow tipped lines 81 in FIGURE 5, and partially in FIGURES 1 and 3. The minimum extent of the operator's field of view, horizontally, is indicated by the arrow tipped lines 81 extending rearwardly from the window 45 in FIGURE 5, and the minimum vertical extent of the field of view is indicated by the arrow tipped lines 81 in FIGURE 2. The operator by moving his head slightly to the left can look through the viewing opening 31 from the position 82 toward the reflector 59 for viewing an image through the front window 53, reflected from the reflector 64, as indicated by the arrow tipped lines 83 in FIGURES 1, 5 and 9. The approximate minimum horizontal field of view through the window 53 is indicated by the lines 83 in FIGURE 5, and the approximate minimum vertical extent of the field of view is indicated by the arrow tipped lines 83 in FIGURE 9. Greater ranges of view are obtained by slight shifting of the head horizontally or vertically.

It will thus be apparent that an extremely compact reflector unit for vehicles has been provided which will enable the vehicle driver to view the area behind as well as in front of the vehicle through said unit by a mere slight movement of the head. It will also be apparent that the unit 15 is mounted above and in front of a part of the windshield which is normally not utilized, so that it will not obstruct the driver's normal field of vision to the front. All of the reflectors of the unit are enclosed within a sealed casing so that the reflectors will be maintained clean and will seldom require cleaning. This will likewise apply to the outer side of the portion of the windshield 23, around which the frame 28 is disposed, and to the inner sides of the windows 45 and 53.

As previously stated, the reflectors 59 and 61 and the inner side of the window 53 can be cleaned, when necessary, through the access opening 76, and this likewise applies to the outer side of the windshield portion surrounded by the frame 28. By removing the fastening 48 the window 45 can be slid slightly from right to left as seen in FIGURE 5 and thereafter swung outwardly to a position in alignment with the guide channels 43 and 44 into which the window 45 can be slidably moved and temporarily supported, so that the reflectors 67 and 70 may be cleaned through the opening 42.

Various modifications and changes are contemplated and may be resorted to, without departing from the function or scope of the invention as hereinafter defined by the appended claims.

I claim as my invention:

1. A front and rear view reflector unit for a vehicle comprising a mounting structure, means adapted to detachably secure said mounting structure to a front corner post of a vehicle roof, a housing secured to and extending outwardly from said mounting structure and having a marginal portion defining a viewing opening, said mounting structure including a cushioning member having a frame portion adapted to be disposed against the outer side of an upper part of the windshield of the vehicle and in which said marginal portion seats with the viewing opening in registration with the opening of said frame, said housing having a forwardly facing front window and a rearwardly facing rear window, said rear window being laterally offset outward from said marginal portion and from the mounting structure, a first set of reflectors contained within said housing and disposed at an angle to one another and to said rear window and viewing opening whereby objects disposed behind said rear window may be observed through said viewing opening, and a second set of reflectors disposed at an angle to the front window and viewing opening and affording a reflected view of objects disposed in front of said front window through said viewing opening.

2. A front and rear view reflector unit for a vehicle as in claim 1, said first set of reflectors including a first reflector disposed in front of and at an angle to said rear window, a second reflector disposed in front of and at an angle to the viewing opening, and a third reflector disposed between and facing said first and second reflectors for reflecting images from the first reflector to the second reflector.

3. A front and rear view reflector unit for a vehicle as in claim 1, said second set of reflectors including a first reflector disposed behind and at an angle to said front window and a second reflector disposed in front of and at an angle to said viewing opening and substantially parallel to said first reflector.

4. A front and rear view reflector unit for a vehicle as in claim 1, said housing cooperating with said frame portion and the windshield portion surrounded by said frame portion to provide a sealed enclosure for said reflectors, means releasably securing said rear window in a closed position for sealing a rear portion of said housing, and means pivotally and slidably supporting said rear window for movement of said window to an open position on an outer side of a part of the housing for affording access to certain of said reflectors through the rear part of the housing normally closed by said rear window.

5. A front and rear view reflector unit for a vehicle as in claim 4, said housing including a bottom wall provided with an access opening, a hinged door normally closing and sealing said access opening, and said access opening being disposed to afford access to the other reflectors and to the inner side of said front window and to the viewing opening when said door is in an open position.

6. A front and rear view reflector unit for a vehicle as in claim 1, said housing being supported by said mounting structure in front of and above an upper corner of the windshield and having a downwardly and rearwardly inclined bottom wall for minimizing the obstruction to view through the windshield caused by said housing.

7. A front and rear view reflector unit for a vehicle as in claim 1, said front window and rear window being disposed above the level of the upper edge of the windshield.

8. A vehicle front and rear view reflector unit comprising a housing having a viewing opening, a front window and a rear window, means mounting said housing on an exterior part of a motor vehicle with said viewing opening positioned exteriorly of and in registration with a part of the vehicle windshield, with said front window disposed to face forwardly and said rear window facing rearwardly and located in an exposed position relative to the vehicle, a first set of reflectors disposed within the housing at an angle to one another and to the rear window and viewing opening so that objects disposed behind said rear window may be observed through the viewing opening, and a second set of reflectors disposed in the housing at an angle to the front window and the viewing opening and affording a reflected view through the viewing opening of objects disposed in front of said front window.

References Cited in the file of this patent
UNITED STATES PATENTS

| | | |
|---|---|---|
| 1,666,236 | Fuerth | Apr. 17, 1928 |
| 2,512,792 | Delaney | June 27, 1950 |
| 2,796,003 | Kaufman | June 18, 1957 |

FOREIGN PATENTS

| | | |
|---|---|---|
| 56,418 | France | July 23, 1952 |